United States Patent [19]

Croteau et al.

[11] Patent Number: 5,757,874
[45] Date of Patent: May 26, 1998

[54] MULTI-SPRING STRIP SPACER FOR NUCLEAR FUEL BUNDLES

[75] Inventors: Edward A. Croteau, Hartland, Wis.; Robert B. Elkins; Thomas G. Evans, both of Wilmington, N.C.; Harold B. King, Wrightsville Beach, N.C.; David G. Smith, Leland, N.C.; Russell P. Higgins; Gerald M. Latter, both of Wilmington, N.C.

[73] Assignee: General Electric Company, Schenectady, N.Y.

[21] Appl. No.: 678,046

[22] Filed: Jul. 10, 1996

[51] Int. Cl.$^6$ ................................ G21C 3/356
[52] U.S. Cl. .............................. 376/442; 376/439
[58] Field of Search ....................... 376/438, 439, 376/441, 442, 462

[56] References Cited

U.S. PATENT DOCUMENTS

| | | | |
|---|---|---|---|
| 3,933,584 | 1/1976 | Litt | 376/442 |
| 5,488,644 | 1/1996 | Johansson | 376/441 |
| 5,519,747 | 5/1996 | Johansson et al. | 376/442 |
| 5,526,387 | 6/1996 | Johansson et al. | 376/439 |
| 5,546,437 | 8/1996 | Matzner et al. | 376/442 |

*Primary Examiner*—Daniel D. Wasil
*Attorney, Agent, or Firm*—Nixon & Vanderhye

[57] ABSTRACT

The spacer comprises a plurality of strips interleaved with one another to form an eggcrate-type pattern defining essentially rectilinear cells for each fuel rod. Each strip includes a central body portion with cantilevered loop spring-like projections extending to opposite sides, with spring contact portions projecting inwardly. Stops are provided along each of the central body regions of the strips intermediate the loop springs that project to the opposite side of the strip. Adjoining walls have loop spring portions for biasing the rod into engagement with opposing stops whereby each fuel rod is supported at six contact points, i.e., four spring contact points and two hard stop contacts opposite the paired spring contacts.

11 Claims, 4 Drawing Sheets

MULTI-SPRING STRIP SPACER FOR NUCLEAR FUEL BUNDLES

TECHNICAL FIELD

The present invention relates to a novel and improved spacer for nuclear fuel bundles and particularly relates to a spacer of the "eggcrate" type having springs, stops and flow tabs integrally formed with strips forming the spacer enabling a reduction of the number of piece parts and complexity of the spacer, improved support for and contact with the nuclear fuel rods, and support of the fuel bundle on its side for handling and transportation without ancillary supports.

BACKGROUND

As well known, nuclear fuel bundles typically comprise a plurality of elongated fuel rods within an enveloping fuel channel, the fuel rods extending between upper and lower tie plates. Intermediate the tie plates are conventionally disposed a plurality of spacers at longitudinally spaced positions along the length of the fuel bundle for maintaining the fuel rods in predetermined laterally spaced positions relative to one another. Many different types of spacers have been proposed and constructed in the past. For example, ferrule-type spacers have been used and these comprise discrete, typically circular elements welded one to another to form a spacer grid and through which circular elements the fuel rods extend. Another type of spacer employs a plurality of strips interleaved with one another to form an "eggcrate" type grid pattern. That is, each strip has a series of laterally spaced slots along one side which receive right angularly disposed strips to form the eggcrate configuration. This configuration defines a plurality of generally square openings or cells for receiving nuclear fuel rods. An example of this type of construction is described and illustrated in U.S. Pat. No. 5,444,748.

One of the many problems associated with the design and construction of spacers which require a substantial number of springs to bias the fuel rods into relatively fixed positions in the fuel bundle is the number of piece parts required to form the spacer. For example, in many designs, even eggcrate-type designs, additional parts are required to form the completed spacer. Further, considerations of pressure drop across the spacer must be accommodated. Complexity of the parts is also a substantial consideration in the formation of the spacer, particularly as fuel rod bundles become more dense. Considerations of support for the fuel rods by the spacers during handling and shipping, as well as during installation and operation within the nuclear reactor must also be accommodated. For example, where springs are utilized, the aggregate weight of the fuel rods during handling and transportation with the fuel bundle on its side must not deform or provide a new set to the springs which could, when the fuel bundle is upright and installed, locate the fuel rods other than in designed positions. When installed in a reactor core, it is also significant to avoid a spring stiffness which would overload the fuel rod while affording a spring flexibility sufficient to maintain the rod in proper position. Further, the spacer must be designed to minimize or eliminate any tendency to strip away the coolant/moderator film on the fuel rods.

DISCLOSURE OF THE INVENTION

In accordance with the present invention, there is provided a spacer having a reduced number of piece parts, reduced complexity, improved capacity for manufacture and performance and an ability to support fuel bundles during handling and transportation without use of ancillary supports. Particularly, the spacer according to the present invention is comprised of a plurality of strips interleaved one with the other to form an "eggcrate" type pattern, defining an essentially rectilinear cell for each of the fuel rods. Each of the strips includes an elongated central body portion disposed in a single plane with a plurality of cantilevered, loop spring-like, projections extending to opposite sides of the central body portion, the projections being spaced one from the other along the length of the strip. Each of the looped spring-like projections on each side includes a spring contact portion which projects inwardly toward the centerline of the cell for bearing engagement with the nuclear fuel rod. Stops are provided along each of the central body portions of the strips intermediate, preferably medially of the loop springs. The arrangement or orientation of the strip is such that adjoining walls in the grid have loop spring portions for bearing against the fuel rod in each cell. The stops are located in adjacent walls opposite the spring portions such that the spring portions bias each rod into engagement with the opposing stops, thereby fixing the position of the rod within the spacer grid. As a consequence, each fuel rod is supported at six points, i.e., four spring contact points and two hard stop contacts opposite the paired spring contacts. Thus, stable support for the fuel rods when subject to service load conditions is achieved.

Each loop spring provides sufficient flexibility to load but not overload the fuel rod and avoids a stiffness which could damage the rod. The flat lateral extensions of each loop spring on opposite sides of the spring/fuel rod contact point enable such flexibility without stiffening the spring and simultaneously permit the spring contact point to lie relatively close to the central portion of the strip. This reduces any tendency of the loop spring to deflect or chatter in the flow stream.

Each of the strips is also provided with flow tabs. When the strips are assembled, the flow tabs lie adjacent adjoining wall portions of each cell on the downstream side of the spacer and can be twisted into the desired form for flowing the coolant/moderator onto the fuel rods for increased critical power performance. The flow tabs, together with the springs and stops, are all formed integrally with the strips, the entirety of the strip being formed by a progressive stamping operation.

With the foregoing construction, it will be appreciated that the number of piece parts required to form the spacer is substantially reduced. With the exception of the band about the periphery of the spacer, the spacer is formed by interleaving of spacer strips which integrally incorporate the springs, stops and flow tabs. With this eggcrate design and integral nature of the springs, stops and flow tabs with the strips, the number of parts needed in the assembly, as well as the complexity of the parts, is reduced. Welds securing the strips to one another are provided along opposite sides of the spacer at each of the junctures between the orthogonally related strips. A peripheral band having spaced slots for receiving tabs on the end of the strips is also welded to ends of the strips to complete the spacer.

One important aspect of the spacer design is the orientation of the stops along common pairs of side edges of each cell of the spacer. With the stops of each cell being oriented on two like side edges of each spacer, the fuel bundle assembly may be disposed on its side and handled with the aggregate weight of the fuel rods and bundle borne by the stops and not by the springs. Otherwise, the springs may obtain a set and, consequently, ineffectively bias the fuel rods into their designed location.

In a preferred embodiment according to the present invention, there is provided a spacer for a nuclear fuel bundle comprising a first set of a plurality of elongated metal strips spaced from and extending generally parallel to one another and having a first central body portion lying in a plane, a second set of a plurality of elongated metal strips spaced from and extending generally parallel to one another and having a second central body portion lying in a plane, the body portions of the first and second sets of strips being interleaved one with the other and extending generally perpendicular to one another to form a grid defining cells spaced from one another having central axes for receiving nuclear fuel rods. Each strip includes a plurality of loop springs projecting from the body portion thereof to each of opposite sides of the spacer and regularly spaced one from the other, the loop springs projecting out of the plane of the body portion of each strip and to one side thereof, each loop spring having a fuel rod contacting portion facing one side, the central body portion of each strip including a stop projecting to a side of the strip opposite from one side thereof and lying between each pair of loop springs projecting to opposite sides of the strip. A first pair of adjoining walls of the interleaved strips of the first and second sets of strips define each cell having the loop springs projecting toward a centerline of the cell, a second pair of adjoining walls of each cell defined by other interleaved strips of the first and second sets of strips having the stops projecting into each cell thereby establishing six points of contact with the fuel rods disposed generally coaxially in the cell.

In a further preferred embodiment according to the present invention, there is provided a spacer for a nuclear fuel bundle comprising a plurality of strips interleaved one with the other to form a generally rectilinear grid defining a plurality of multi-walled cells for receiving nuclear fuel rods, first adjacent walls of each cell having springs cantilevered to opposite sides of the spacer carrying fuel rod contacting portions adjacent distal ends thereof, second adjacent walls of each cell and different from the first walls, each of the second walls including a stop disposed at a location within the spacer intermediate the contacting portions of the springs and in opposition across the opening to the cantilevered springs of a wall of the first adjacent walls, the springs and stops being formed integrally with each of the strips.

Accordingly, it is a primary object of the present invention to provide a novel and improved spacer for a nuclear fuel bundle having a reduced number of piece parts and complexity, improved performance and having the capacity to handle and transport the fuel bundles without ancillary supports for the spacers.

BEST MODE FOR CARRYING OUT THE INVENTION

Figure 1:
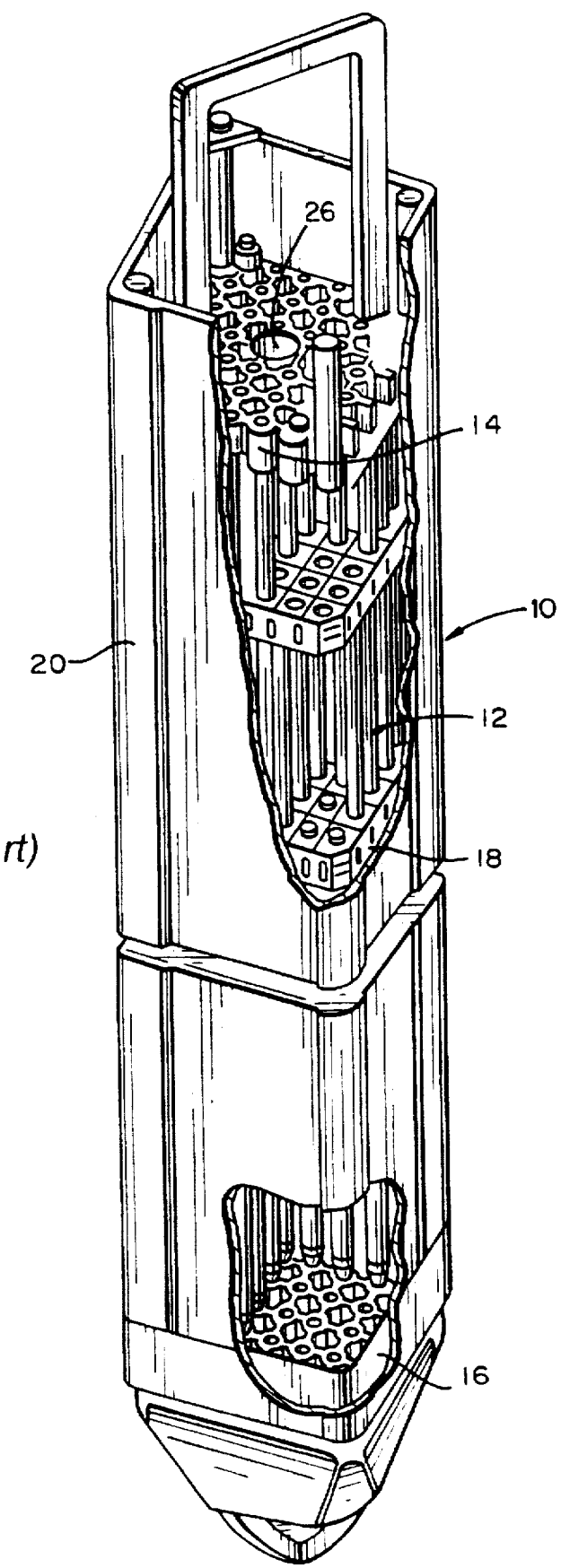
FIG. 1 is a fragmentary cross-sectional view of a nuclear fuel bundle with parts broken out and in cross-section for ease of illustration.

Referring now to FIG. 1, there is illustrated a nuclear fuel assembly, generally designated 10, including a plurality of fuel elements or rods 12 supported between an upper tie plate 14 and a lower tie plate 16. Fuel rods 12 pass through a plurality of fuel rod spacers 18 at vertically spaced positions along the fuel bundle. Spacers 18 provide intermediate support to retain the elongated fuel rods 12 in spaced relation relative to one another and to restrain the fuel rods from lateral vibration. With respect to FIG. 1, an 8×8 array of fuel rods is illustrated. It will be appreciated, however, that the invention hereof is applicable to different arrays of fuel rods, for example, 10×10 or 11×11 arrays, a spacer of the latter type being illustrated in FIG. 2.

Each fuel rod is formed of an elongated tube with nuclear fuel pellets and other materials sealed in the tube by end plugs. The lower end plugs register in bores formed in the lower tie plate 16, while the upper end plugs are disposed in cavities in the upper tie plate 14. Additionally, the fuel assembly includes a channel 20 substantially square in cross-section, and sized to form a sliding fit over the upper and lower tie plates and the spacers so that the nuclear fuel bundle, including the channel, tie plates, rods and spacers, can be removed.

Figure 2:
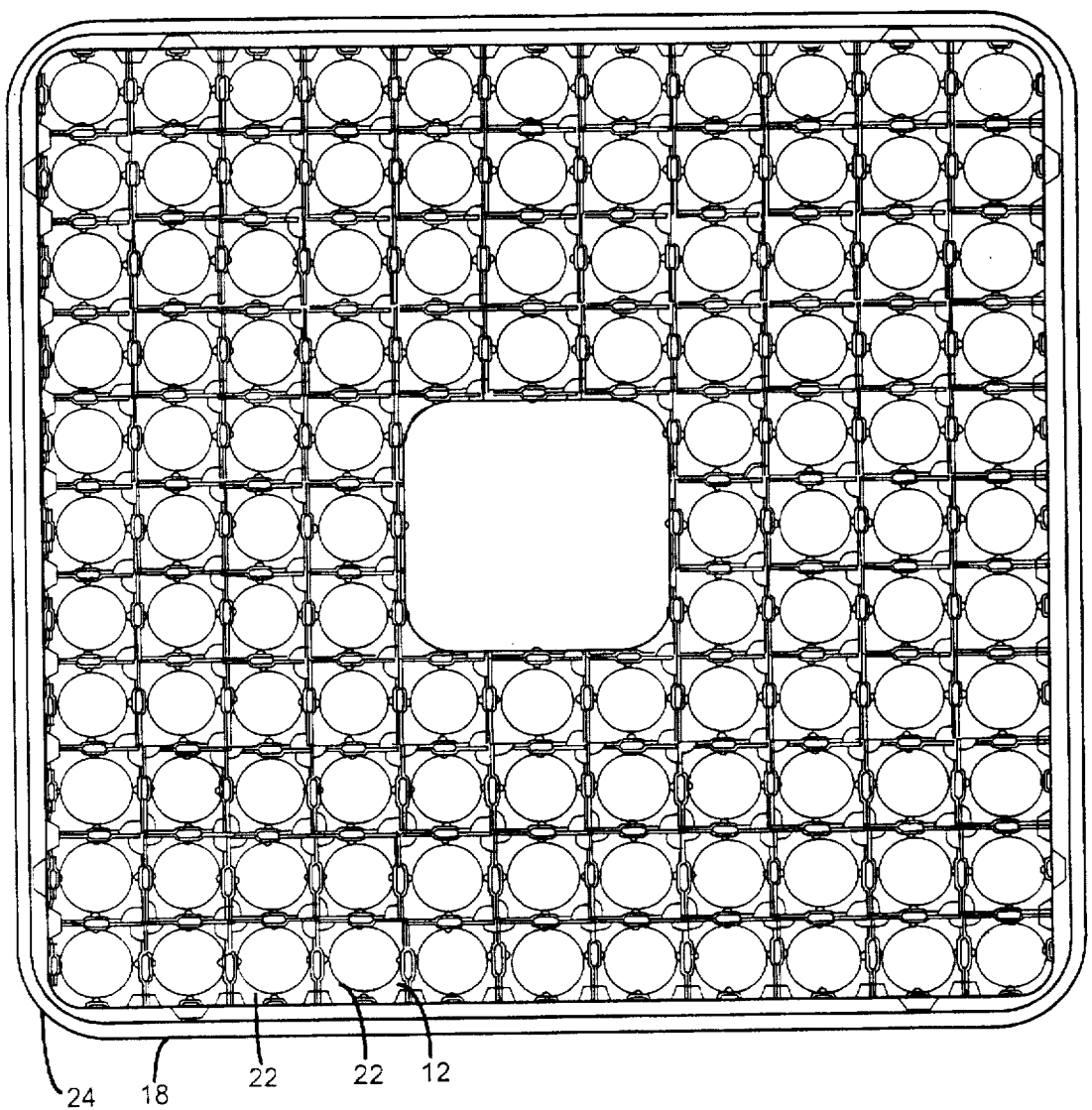
FIG. 2 is a plan view of a spacer for the fuel bundle of FIG. 1 constructed in accordance with the present invention.

Turning now to FIG. 2, there is illustrated a spacer 18 constructed in accordance with the present invention. The spacer 18 is of the "eggcrate" type formed of orthogonally related strips interleaved one with the other. As illustrated, the strips define cells 22 for receiving the fuel rods 12, there being a central opening for one or more water rods in the illustrated configuration. Additionally, a band 24 forms the perimeter of the eggcrate spacer and is secured, for example, by welding to the opposite ends of the strips forming the interleaved eggcrate-type spacer.

Figures 3, 4, 5:
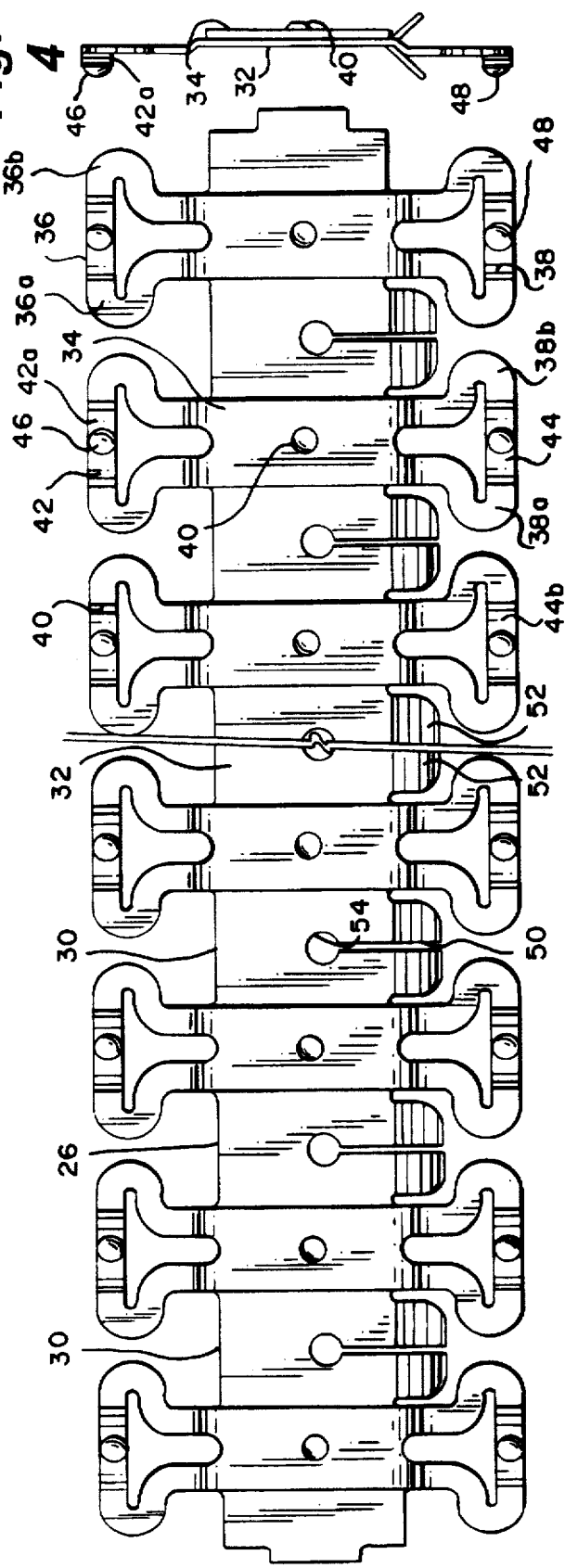
FIG. 3 is a side elevational view of a strip forming a part of the eggcrate construction of the spacer hereof.
FIG. 4 is an end elevational view of the strip illustrated in FIG. 3.
FIG. 5 is a top plan view of the strip illustrated in FIG. 3.

Referring to FIG. 3, a first set of strips 26 formed of thin metal, for example, a zirconium alloy, Inconel or stainless steel, are provided and interleaved with a second set of strips 28 (FIG. 6) formed of similar material. Strip 26 includes a central band or body portion 30 having body portion segments 32 spaced one from the other along the length of the strip and connected by integrally formed elements 34 which project out of the plane of the segments 32. The elements 34 at their opposite ends extend beyond the upper and lower edges of the segments 32 and form springs 36, 38 which have inwardly projecting portions along opposite sides of the strip. The elements 34 each have a projecting stop 40 which, in a preferred form, is in the nature of a dimple punched from the metal material to extend to the opposite side of the strip from springs 36, 38 and which dimple 40 lies along a medial line of the strip, i.e., along its horizontal axis.

The springs 36 and 38 are each of the loop spring type. That is, each spring 36 includes laterally extending arcuate leg portions 36a and 36b and each spring 38 includes laterally extending arcuate leg portions 38a and 38b. The spring leg portions 36a, 36b and 38a, 38b project laterally beyond the side margins of the element 34 and integrally form end closed loops 42 and 44, respectively. Loops 42 and 44 have inwardly projecting portions 42a and 44a, portion 42a having a spring dimple 46 and loop projecting portion 44a having a spring dimple 48. Dimples 46 and 48 project to the side of the strip opposite the stops 38. Laterally adjacent loop springs 36 and 38 lie close to one another but are sufficiently spaced apart to enable insertion of the orthogonally related strips along one side of the spacer as described hereafter.

The central body portion 30 of strip 26 includes slots 50 at spaced intervals therealong which open along one edge of the strip 26. In the strip illustrated in FIG. 3, a pair of flow tabs 52 are formed as projecting elements from the body portion 30 on opposite sides of slot 50. The slots 50 terminate in central circular openings 54 along the medial line of the strip which provide stress relief openings to facilitate manufacture of the strip. The flow tabs 52 are twisted, as illustrated in FIG. 5, during the progressive stamping formation of the strip.

Figure 6:
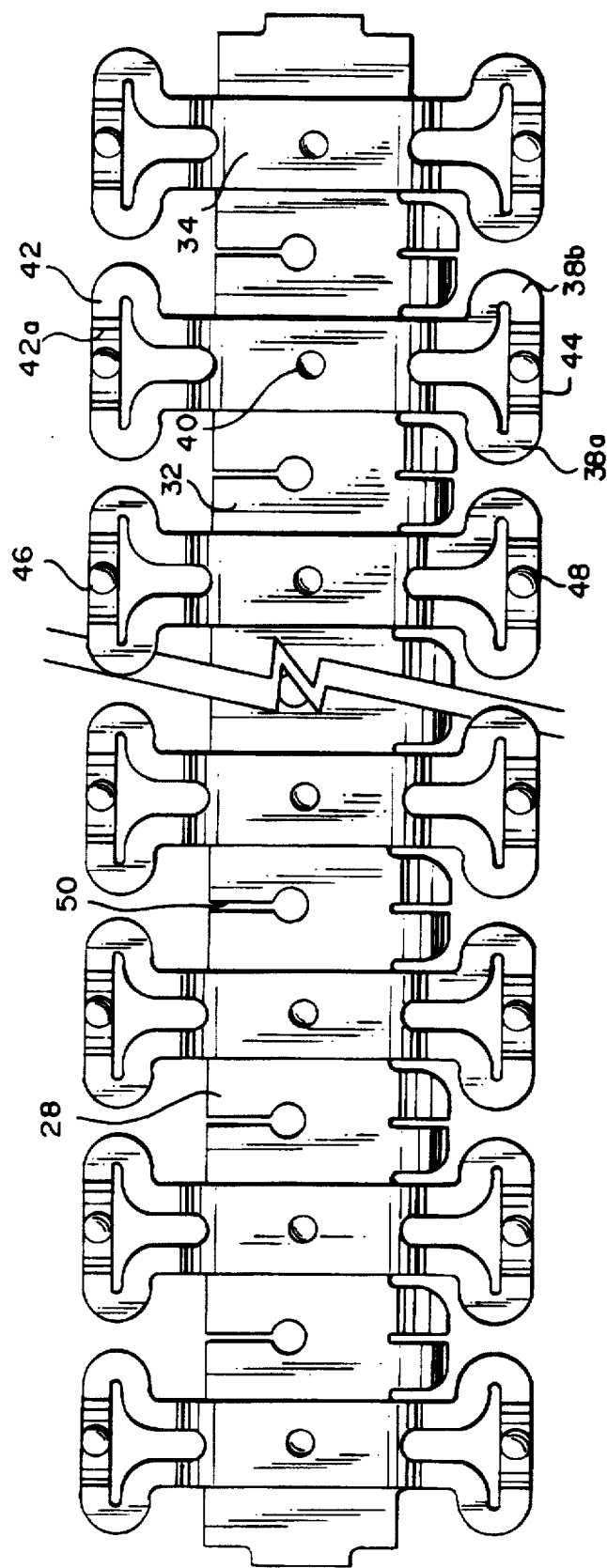
FIG. 6 is a view similar to FIG. 3 illustrating a right angularly oriented strip for interleaving with the strip of FIG. 3 and other strips to form the eggcrate configuration of the spacer hereof.

The second strip 28 illustrated in FIG. 6 is similarly formed, with the sole difference residing in the slots 50 formed in the central body portion. In this strip, the slots 50 extend to the opposite side edge of the central portion between the elements 34 and along the edge of strip 28 opposite the flow tabs 52. Thus, it will be appreciated that the strips 26 and 28 can be interleaved at right angles to one another to form the grid pattern disclosed in FIG. 2 with the margins of the slots 50 and 52 engaging the elements 32 of the orthogonally related strips. When the strips are interleaved as illustrated, it will be appreciated that the loop springs 36 and 38 projecting from the body portion on each of a pair of orthogonally related adjacent sides of a spacer cell project out of the plane of the body portions 26 and 28 for contact with a fuel rod in the cell. Opposite each of the loop springs and on the opposite pair of orthogonally related adjacent sides are stops 40. Thus, the springs lie along a pair of adjoining orthogonally related walls of each cell, while the stops lie along a pair of opposite orthogonally related adjoining walls of each cell. Consequently, there are six points of contact between the strips forming each cell and the fuel rod within the cell, four loop springs and two centrally located stops.

It will be appreciated that with the foregoing described design, the number of piece parts for forming the spacer is substantially reduced by integrating the springs, hard stops and flow tabs directly into each strip. Upon assembly of the strips to form the spacer grid, the spacer may be completed by forming spot welds at the upper and lower junction of each of the orthogonally related strips. The peripheral band surrounding the spacer has slots for receiving end tabs 60 of the strips, the end tabs 60 and band being welded to one another. This multi-spring concept achieves simplicity in design by making each strip by a reliable progressive stamping manufacturing technology and which technique is cost-effective and speedy. Assembly of the strips to form the spacer is readily accomplished inasmuch as there are no loose parts to complete the formation of each cell because the springs, hard stops and flow tabs are formed integrally with the strips and assembled in eggcrate fashion. The strips are aligned within a fixture prior to welding such that the springs are all oriented in the same direction in the spacer. The hard stops are likewise located in the same orientation within the spacer. The welds are first applied to one side of the spacer. The spacer is then turned over on the fixture and welds are applied on the opposite side of the spacer. Additionally, with the hard stops for each cell oriented identically along common sides of the spacer, the spacer can be disposed horizontally with the fuel assembly resting on horizontal edges of the spacer with the weight of the fuel rods on the hard stops. Consequently, the springs are not stressed or take a set during handling and transportation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A spacer for a nuclear fuel bundle comprising:
    a first set of a plurality of elongated metal strips spaced from and extending generally parallel to one another and having a first central body portion lying in a plane;
    a second set of a plurality of elongated metal strips spaced from and extending generally parallel to one another and having a second central body portion lying in a plane, said body portions of said first and second sets of strips being interleaved one with the other and extending generally perpendicular to one another to form a grid defining cells spaced from one another having central axes for receiving nuclear fuel rods;
    each said strip including a plurality of loop springs projecting from said body portion thereof to each of opposite sides of said spacer and regularly spaced one from the other, said loop springs projecting out of the plane of the body portion of each strip and to one side thereof, each loop spring having a fuel rod contacting portion facing said one side, said central body portion of each strip including a stop projecting to a side of said strip opposite from said one side thereof and lying between each pair of loop springs projecting to opposite sides of said strip;
    a first pair of adjoining walls of the interleaved strips of said first and second sets of strips defining each cell having said loop springs projecting toward a centerline of said cell, a second pair of adjoining walls of each cell defined by other interleaved strips of said first and second sets of strips having said stops projecting into each cell thereby establishing six points of contact with the fuel rods disposed generally coaxially in said cell.

2. A spacer according to claim 1 including at least a pair of flow tabs projecting toward the centerline of each cell.

3. A spacer according to claim 1 including a flow tab adjacent each corner of a cell and projecting toward the centerline of said cell for directing coolant/moderator on the fuel rods.

4. A spacer according to claim 1 wherein said strips are arranged in said spacer with each cell oriented to face a single edge of said spacer.

5. A spacer according to claim 1 wherein said loop springs are resiliently mounted on said body portions for resilient flexing movement toward and away from the axes of said cells.

6. A spacer according to claim 1 wherein the loop springs along opposite sides of each strip are cantilevered from said body portion.

7. A spacer for a nuclear fuel bundle comprising:
    a plurality of strips interleaved one with the other to form a generally rectilinear grid defining a plurality of multi-walled cells for receiving nuclear fuel rods;
    first adjacent walls of each cell having springs cantilevered to opposite sides of said spacer carrying fuel rod contacting portions adjacent distal ends thereof;
    second adjacent walls of each said cell and different from said first walls, each of said second walls including a stop disposed at a location within the spacer intermediate the contacting portions of the springs and in opposition across said [opening] cell to said cantilevered springs of a wall of said first adjacent walls, said springs and stops being formed integrally with each of said strips; said springs comprising loop springs resiliently mounted on said body portions for resilient flexing movement toward and away from the axes of said cells.

8. A spacer according to claim 7 including at least a pair of flow tabs projecting toward the centerline of each cell.

9. A spacer according to claim 7 including a flow tab adjacent each corner of a cell and projecting toward the centerline of said cell for directing coolant/moderator on the fuel rods.

10. A spacer according to claim 7 wherein said strips are arranged in said spacer with the stops for each cell oriented to face a single edge of said spacer.

11. A spacer according to claim 7 wherein said strips are arranged in said spacer with at least one stop of each cell oriented to face a single edge of said spacer.

* * * * *

UNITED STATES PATENT AND TRADEMARK OFFICE
CERTIFICATE OF CORRECTION

PATENT NO. : 5,757,874
DATED : May 26, 1998
INVENTOR(S) : Edward A. Croteau, et.al, It is certified that error appears in the above-identified patent and that said Letters Patent is hereby corrected as shown below:

Title page, item [56], insert the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 3 | 9 | 3 | 3 | 5 | 8 | 4 | 01/1976 | LITT | | | |
| | | 5 | 4 | 8 | 8 | 6 | 4 | 4 | 01/1996 | JOHANSSON | | | |
| | | 5 | 5 | 1 | 9 | 7 | 4 | 7 | 05/1996 | JOHANSSON ET AL | | | |
| | | 5 | 5 | 2 | 6 | 3 | 8 | 7 | 06/1996 | JOHANSSON ET AL | | | |
| | | 5 | 5 | 4 | 6 | 4 | 3 | 7 | 08/1996 | MATZNER ET AL | | | |
| | | 3 | 7 | 4 | 6 | 6 | 1 | 9 | 07/17/73 | IWAO | | | |
| | | 4 | 5 | 4 | 4 | 5 | 2 | 2 | 10/01/85 | CURULLA ET AL | | | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 2 | 9 | 1 | 7 | 3 | 6 | 11/23/88 | EPO | | | |
| | | | | | | | | | | | | | |

Signed and Sealed this

Sixth Day of April, 1999

Attest:

Attesting Officer

Q. TODD DICKINSON

Acting Commissioner of Patents and Trademarks